United States Patent
Natarajan

(10) Patent No.: US 12,217,306 B2
(45) Date of Patent: Feb. 4, 2025

(54) METHOD FOR IDENTIFYING ANOMALOUS TRANSACTIONS USING MACHINE LEARNING

(71) Applicant: Google LLC, Mountain View, CA (US)

(72) Inventor: Ramesh Natarajan, Pleasantville, NY (US)

(73) Assignee: Google LLC, Mountain View, CA (US)

( * ) Notice: Subject to any disclaimer, the term of this patent is extended or adjusted under 35 U.S.C. 154(b) by 80 days.

(21) Appl. No.: 17/972,134

(22) Filed: Oct. 24, 2022

(65) Prior Publication Data

US 2023/0137892 A1    May 4, 2023

Related U.S. Application Data

(60) Provisional application No. 63/273,360, filed on Oct. 29, 2021.

(51) Int. Cl.
| | |
|---|---|
| *G06Q 40/00* | (2023.01) |
| *G06Q 40/02* | (2023.01) |
| *G06T 11/00* | (2006.01) |
| *G06T 11/20* | (2006.01) |

(52) U.S. Cl.
CPC ............ *G06Q 40/02* (2013.01); *G06T 11/001* (2013.01); *G06T 11/206* (2013.01)

(58) Field of Classification Search
CPC ...... G06Q 40/00; G06Q 40/02; G06T 11/001; G06T 11/206
See application file for complete search history.

(56) References Cited

U.S. PATENT DOCUMENTS

| | | | | |
|---|---|---|---|---|
| 9,485,265 | B1* | 11/2016 | Saperstein | G06F 16/24575 |
| 10,482,464 | B1* | 11/2019 | Dietrich | G06Q 20/4016 |
| 10,699,276 | B1* | 6/2020 | Smith | G06Q 20/4014 |
| 11,182,818 | B1* | 11/2021 | Fjermestad | G06Q 20/4016 |
| 11,830,005 | B2* | 11/2023 | Cifarelli | G06N 20/00 |
| 2016/0328698 | A1* | 11/2016 | Kumaraguruparan | H04W 4/029 |
| 2017/0364918 | A1* | 12/2017 | Malhotra | G06Q 20/325 |
| 2018/0103047 | A1* | 4/2018 | Turgeman | G06Q 20/4014 |
| 2020/0211019 | A1* | 7/2020 | Allbright | G06N 20/10 |

(Continued)

FOREIGN PATENT DOCUMENTS

WO   WO-2016154419 A1 * 9/2016 ............ G06F 21/554

OTHER PUBLICATIONS

Follow the trail: Machine learning for fraud detection in Fintech applications B Stojanović, J Boži ć, K Hofer-Schmitz, K Nahrgang . . . —Sensors, 2021—mdpi.com (Year: 2021).*

(Continued)

*Primary Examiner* — Lalita M Hamilton
(74) *Attorney, Agent, or Firm* — Lerner David LLP

(57) ABSTRACT

The present disclosure provides various transformations to be used in analysis of a large number of transactions to detect anomalies that would indicate potential fraudulent or criminal activity. Such transformations may be applied, for example, using a machine learning system. According to some examples, each of various transformations may be used to detect a particular type of behavioral anomaly. When multiple disparate transformations are considered together by the machine learning system, anomalous activity related to potential fraudulent or criminal activity can be detected more frequently and with greater accuracy.

20 Claims, 4 Drawing Sheets

(56) References Cited

U.S. PATENT DOCUMENTS

| | | | | |
|---|---|---|---|---|
| 2020/0211022 | A1* | 7/2020 | Allbright | H04L 63/10 |
| 2020/0357234 | A1* | 11/2020 | Higgins | G07F 17/3239 |
| 2021/0312452 | A1* | 10/2021 | Allbright | G06N 5/04 |
| 2021/0357436 | A1* | 11/2021 | Filios | G06Q 40/00 |
| 2022/0138754 | A1* | 5/2022 | Lorenz | G06Q 20/4016 |
| | | | | 705/64 |
| 2023/0096523 | A1* | 3/2023 | Thapliyal | G06F 16/2264 |
| | | | | 707/736 |
| 2023/0107711 | A1* | 4/2023 | Crews, Jr. | G06Q 20/401 |
| | | | | 705/39 |
| 2023/0113752 | A1* | 4/2023 | Jorlett | G06N 5/04 |
| | | | | 705/44 |
| 2023/0137734 | A1* | 5/2023 | Afzal | G06Q 20/407 |
| | | | | 726/22 |

OTHER PUBLICATIONS

"Anti-money Laundering Market Size Worth $3.19 Billion By 2028: Grand View Research, Inc." San Francisco, Feb. 16, 2021 /PRNewswire/ [retrieved Jan. 24, 2023] Retrieved from the internet: <https://www.prnewswire.com/news-releases/anti-money-laundering-market-size-worth-3-19-billion-by-2028-grand-view-research-inc-301228672.html>, 6 pages.

* cited by examiner

| Row | Money IN | Money OUT | #Txn IN | #Txn OUT | Original | capped log | VWN (R) | MFWN (S) | EFWN (S,T) | FWN (S,T) |
|---|---|---|---|---|---|---|---|---|---|---|
| 1 | 10 | 100 | 2 | 5 | 0.100 | 2.303 | 0.002 | 0.041 | 0.023 | 0.005 |
| 2 | 20 | 100 | 1 | 2 | 0.200 | 1.609 | 0.004 | 0.041 | 0.034 | 0.000 |
| 3 | 5 | 5000 | 3 | 7 | 0.001 | 6.908 | 0.001 | 0.001 | 0.000 | 0.000 |
| 4 | 1000000 | 900000 | 1 | 1 | 0.900 | 0.105 | 0.900 | 0.119 | 0.119 | 0.000 |
| 5 | 1000 | 800 | 4 | 1 | 0.800 | 0.223 | 0.158 | 0.257 | 0.141 | 0.031 |
| 6 | 594 | 4269 | 1 | 12 | 0.139 | 1.972 | 0.097 | 0.097 | 0.011 | 0.097 |
| 7 | 170 | 8231 | 1 | 4 | 0.021 | 3.880 | 0.019 | 0.007 | 0.004 | 0.001 |
| 8 | 2243 | 4486 | 7 | 14 | 0.500 | 0.693 | 0.358 | 0.381 | 0.094 | 0.373 |
| 9 | 6903 | 6283 | 1 | 22 | 0.910 | 0.094 | 0.802 | 0.829 | 0.012 | 0.829 |
| 10 | 20 | 20 | 1 | 1 | 1.000 | 0.000 | 0.004 | 0.133 | 0.133 | 0.000 |
| 11 | 500 | 500 | 1 | 44 | 1.000 | 0.000 | 0.100 | 0.995 | 0.000 | 0.995 |
| 12 | 6903 | 6283 | 20 | 22 | 0.910 | 0.094 | 0.802 | 0.829 | 0.356 | 0.021 |

Fig. 3

METHOD FOR IDENTIFYING ANOMALOUS TRANSACTIONS USING MACHINE LEARNING

CROSS-REFERENCE TO RELATED APPLICATIONS

The present application claims the benefit of the filing date of U.S. Provisional Patent Application No. 63/273,360 filed Oct. 29, 2021, the disclosure of which is hereby incorporated herein by reference.

BACKGROUND

A signature of anomalous transactions consistent with criminal activity is the rapid movement of funds through accounts, often coupled to unusual patterns of collection and dispersal of funds through multiple third parties. Conventional techniques detect such patterns by considering a moving window of short duration, such as a couple of days, across the banking activity for a customer or bank entity, and count the number of times in these windows when the net inflow minus the outflow is zero or close to zero. In this approach, the number of such "zero netting windows," in relation to the background of total number of windows, is very infrequent and the detection threshold is therefore very small. For this reason, the detection threshold above the background can only be varied in a small range with very low discriminative salience. In addition, at any threshold, the number of false positives that can arise are also large. Additionally, the conventional approach can be easily circumvented, either from an insider knowledge of the triggering rules, or by the examination of alerts that are generated using innocuous test cases to detect triggering conditions before an actual money laundering attempt is made in a different account.

BRIEF SUMMARY

The present disclosure provides for identifying money laundering activity across individual or linked bank accounts which can be used either directly as a signature to raise suspicious account activity alarms, or as a feature transformation for automated money laundering detection and classification systems.

The systems and methods described herein may be implemented in a transaction activity monitoring system or a criminal activity alert system in institutions. Based on account transaction activity of a customer, the proposed system can be used to generate a risk score or a risk feature for an automated detection system with greater salience and better precision-recall rates over alternative approaches for detecting account activity related to rapid movement of funds. The customer may be an individual or a commercial entity.

One aspect of the disclosure provides a system for detecting anomalous activity related to potential fraud or criminal activity among a plurality of transactions, comprising memory, and one or more processors in communication with the memory. The one or more processors are configured to review the plurality of transactions; identify, based on the review, one or more sets of potentially related transactions occurring within a predetermined period of time; generate, based on application of a machine learning model, results of various transformations applied to the identified one or more sets of potentially related transactions; and identify, based on the results, potentially anomalous activity corresponding to the one or more sets of potentially related transactions.

In reviewing the one or more sets of potentially related transactions, the one or more processors may be configured to apply a moving time window over a predetermined span of time. In identifying the one or more sets of potentially related transactions, the one or more processors may be configured to aggregate individual transactions within the moving time window based upon one or more characteristics of the transactions. The various transformations may include at least one of value weighted netting, maximum frequency weighted netting, equal frequency weighted netting, or funneling weighted netting.

In some examples, in identifying potentially anomalous activity the one or more processors may be further configured to identify which of the results meets or exceeds a predetermined threshold. In identifying potentially anomalous activity the one or more processors may be further configured to generate a heat map, wherein results exceeding a first threshold are indicated using a first color and results exceeding a second threshold are indicated using a second color. Each of the various transformations may be based on one or more parameters, the one or more parameters relating to at least one of an aggregate amount for a given set of transactions or an aggregate number of transactions in the given set of transactions. In identifying potentially anomalous activity, the one or more processors may be further configured to identify multiple results for a given set of transactions that exceeds a first threshold corresponding to a moderate likelihood of anomalous activity. In identifying potentially anomalous activity, the one or more processors may be further configured to identify at least one result for a given set of transactions that exceeds a second threshold corresponding to a high likelihood of anomalous activity. In identifying potentially anomalous activity, the one or more processors may be further configured to trigger an alert flagging the potential anomalous activity.

Another aspect of the disclosure provides a method of detecting anomalous activity related to potential fraud or criminal activity among a plurality of transactions. The method comprises reviewing, with one or more processors, the plurality of transactions; identifying, with the one or more processors based on the review, one or more sets of potentially related transactions occurring within a predetermined period of time; generating, with the one or more processors based on application of a machine learning model, results of various transformations applied to the identified one or more sets of potentially related transactions; and identifying, with the one or more processors based on the results, potentially anomalous activity corresponding to the one or more sets of potentially related transactions.

According to some examples, the reviewing may include applying a moving time window over a predetermined span of time, and the identifying of the one or more sets of potentially related transactions comprises aggregating individual transactions within the moving time window based upon one or more characteristics of the transactions. The various transformations may include at least one of value weighted netting, maximum frequency weighted netting, equal frequency weighted netting, or funneling weighted netting. Identifying potentially anomalous activity may include identifying which of the results meets or exceeds a predetermined threshold. Identifying potentially anomalous activity may include generating a heat map, wherein results exceeding a first threshold are indicated using a first color and results exceeding a second threshold are indicated using a second color. Each of the various transformations may be based on one or more parameters, the one or more parameters relating to at least one of an aggregate amount for a given set of transactions or an aggregate number of transactions in the given set of transactions. Identifying potentially anomalous activity may include identifying multiple results for a given set of transactions that exceeds a first threshold corresponding to a moderate likelihood of anomalous activity. Identifying potentially anomalous activity may include identifying at least one result for a given set of transactions that exceeds a second threshold corresponding to a high likelihood of anomalous activity. Identifying potentially anomalous activity may include triggering an alert flagging the potential anomalous activity.

Yet another aspect of the disclosure provides a non-transitory computer-readable medium storing instructions executable by one or more processors for performing a method of detecting anomalous activity related to potential fraud or criminal activity among a plurality of transactions. Such method may comprise reviewing the plurality of transactions; identifying, based on the review, one or more sets of potentially related transactions occurring within a predetermined period of time; generating, based on application of a machine learning model, results of various transformations applied to the identified one or more sets of potentially related transactions; and identifying, based on the results, potentially anomalous activity corresponding to the one or more sets of potentially related transactions.

BRIEF DESCRIPTION OF THE DRAWINGS

FIG. 3 is an example table illustrating example results of transformations computed according to aspects of the disclosures.

DETAILED DESCRIPTION

The present disclosure provides various transformations to be used in analysis of a large number of transactions to detect anomalies that would indicate potential fraudulent or criminal activity. Such transformations may be applied, for example, using a machine learning system. According to some examples, each of various transformations may be used to detect a particular type of behavioral anomaly. When multiple disparate transformations are considered together by the machine learning system, anomalous activity related to potential fraudulent or criminal activity can be detected more frequently and with greater accuracy.

EXAMPLE SYSTEMS

Figure 1:
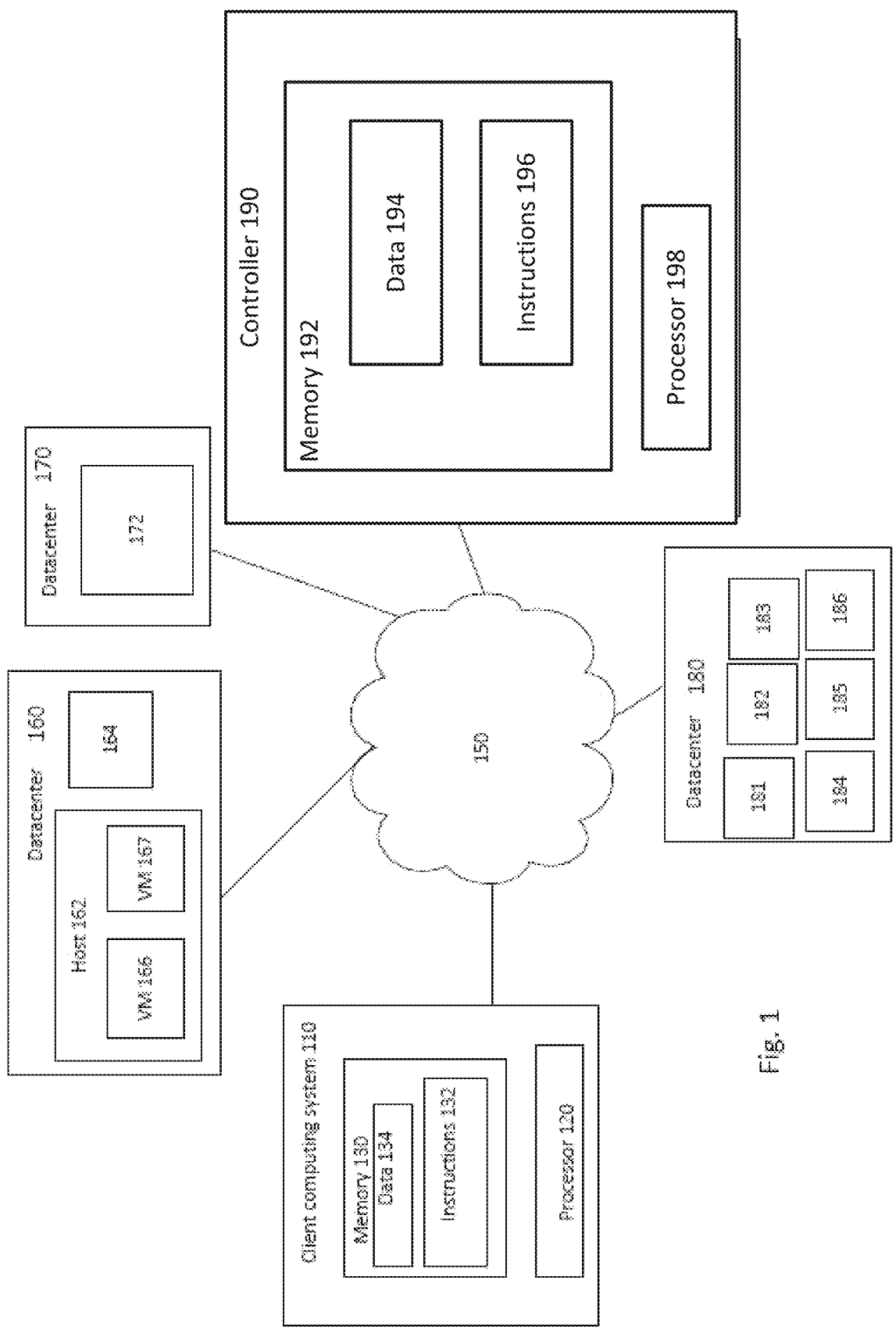
FIG. 1 is a block diagram of an example system according to aspects of the disclosure.

FIG. 1 illustrates an example system including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

Each client 110 may be a personal computer or a mobile device, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a data store as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The datacenters 160-180 may be positioned a considerable distance from one another. For example, the datacenters may be positioned in various countries around the world. Each datacenter 160, 170, 180 may include one or more computing devices, such as processors, servers, shards, or the like. For example, as shown in FIG. 1, datacenter 160 includes computing devices 162, 164, datacenter 170 includes computing device 172, and datacenter 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 1, it should be understood that any number of virtual machines may be supported by any number of host computing devices. Moreover, it should be understood that the configuration illustrated in FIG. 1 is merely an example, and that the computing devices in each of the example datacenters 160-180 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

In some examples, each datacenter 160-180 may also include a number of storage devices (not shown), such as hard drives, random access memory, disks, disk arrays, tape drives, or any other types of storage devices. The datacenters 160-180 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above. The controller 190 may be configured to redistribute or repartition data stored among the computing devices in the datacenters 160-180.

Client 110, datacenters 160-180, and controller 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

Client 110 may request access to data stored in the computing devices of the data centers 160-180. Such request may be handled by the controller 190 and/or one or more of the computing devices in datacenters 160-180. In some examples, a response to a request may involve or otherwise require manipulation of the data, such as using the operations described in greater detail herein.

Figure 2:
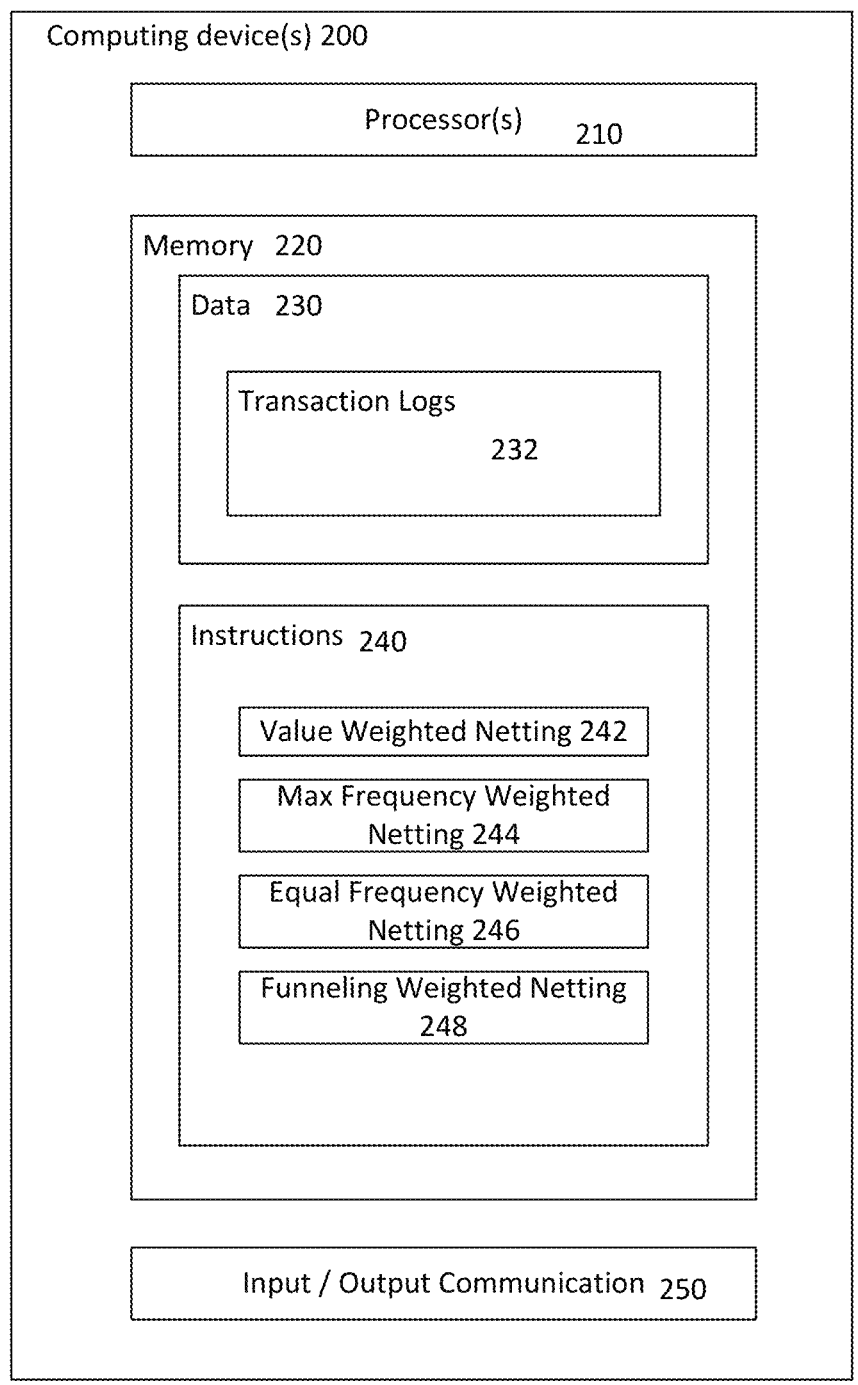
FIG. 2 is a block diagram of another example system according to aspects of the disclosure.

FIG. 2 is a block diagram illustrating an example system having one or more computing devices 200 for performing a shuffle operation in accordance with the present disclosure. The computing devices 200 may be included in a distributed data processing system, such as a computing device of one of datacenters 160-180, or a controller 190, as shown in FIG. 1. The computing devices 200 may be configured to run complex queries on large volumes of data, such as "JOIN" and "GROUP BY" operations, by repartitioning the data. Such operations may be performed in response to queries.

Data in the distributed data processing system may be stored transiently, such as in a distributed in-memory file system, or disk, or by any combination of the two. In some examples, the data may be stored in virtual machines, such as the virtual machines 166-167 hosted by the data centers 160-180 of FIG. 1.

The computing devices 200 may include one or more processors 210, servers, shards, cells, or the like. It should be understood that each computing device may include any number of processors or computing devices, that the number of such devices in the computing devices may vary over time, for example, as hardware is removed, replaced, upgraded, or expanded.

The computing devices 200 may also include a number of storage devices or memory 220, such as hard drives, random access memory, disks, disk arrays, tape drives, or any other types of storage devices. The computing devices 200 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. The computing device 200 may include a number of other devices in addition to the storage devices, such as communication devices 250 to enable input and output between the computing devices, such as cabling, routers, etc.

Memory 220 of each of the computing devices can store information accessible by the one or more processors 210, including data 230 that is received at or generated by the computing devices 200, and instructions 240 that can be executed by the one or more processors 210.

The data 230 may include transaction logs 232 or other data structures identifying transactions, such as deposits or withdrawals of funds. The transactions may include, for example, dates, times, amounts, identifiers associated with responsible parties, or any of a variety of other information related to the transactions. According to some examples, the logs 232 may indicate an amount of funds deposited, an amount of funds withdrawn, a number of deposit transactions, and a number of withdrawal transactions. The information included in the transaction logs 232 may be obtained from any of a variety of sources, such as ledgers, reports, or other data from one or more institutions.

According to some examples, the data 230 may include a subset of transactions occurring within a predetermined period of time. For example, a sliding window encompassing a time period, such as several days, may be considered over a longer time horizon, such as an interval of time of several months or years. The data 230 may be from, for example, retail customers, commercial customers, or any other entity.

The instructions 240 may be executed by the one or more processors 210 to run one or more transformations using data from the transaction logs 232. For example, the transformations may include a value weighted netting transformation 242, a maximum frequency weighted netting transformation 244, an equal frequency weighted netting transformation 246, and a funneling weighted netting transformation 248. According to some examples, the instructions 240 may include one or a subset of transformation, additional transformations, or a combination of any of transformations 242-248 and other transformations. Running each transformation 242-248 for a subset of data may produce a resulting value. The value may be a score or rating or indicator of a particular event, such as an anomalous group of transactions consistent with criminal activity.

The transformations 242-248 may be run using data from the transactions logs 232. For example, the transformations 242-248 may be applied continually using transactions occurring within the sliding window as the sliding window moves across the time horizon.

The value weighted netting (VWN) transformation 242 may be represented by the following:

$$\text{VWN:'} = \text{TANH}(\max(B,C)/R)^* (\min(B+1,C+1)/\max(B+1,C+1))'$$

wherein B is a net amount deposited, C is a net amount withdrawn, and R is a related parameter corresponding to a threshold amount transferred in or out in the netted transactions. For example, R may be selected and adjusted to fine tune the transformation 242, by setting R to values corresponding to a higher amount, such as 10,000, 50,000, etc., or a lower amount, such as 1,000. The netting ratios resulting from the VWN transformation may be modulated by a factor that accounts for a magnitude of the transferred amounts involved in the netting. For example, the threshold R may be set to any value based on how aggressively transactions should be flagged as potential criminal activity, such as by only capturing large transfer amounts, or by additionally capturing lower transfer amounts and thus likely flagging a greater number of total transactions. The TANH function represents the hyperbolic tangent function. The arguments to the max and min in the formulas use a form "add 1" smoothing to handle the case when B and C are small, even zero, in a numerically stable way.

The maximum frequency weighted netting (MFWN) transformation 244 may be represented by the following:

$$\text{MFWN:'} = \text{TANH}(\max(D,E)/S)^* (\min(B+1,C+1)/\max(B+1,C+1))'$$

where D is a number of deposits and E is a number of withdrawals and S is a parameter that accounts for a number of transactions involved. Accordingly, the netting ratios produced by the MFWN transformation 244 may be modulated by factor, S, that accounts for the number of transactions involved.

The equal frequency weighted netting (EFWN) transformation 246 may be represented by the following:

$$\text{EFWN:'} = \text{EXP}(-\text{abs}(D-E)/T)^* \text{TANH}(\max(D,E)/S)^* (\min(B+1,C+1)/\max(B+1,C+1))'$$

which introduces a "sharpening transformation" to capture cases when a number of incoming and outgoing transactions in the netting are approximately equal—the more equal they are the greater the salience of the EFWN transformation. T is a parameter that measures the sharpness with which the equality between D and E is measured, and the larger the magnitude of T the closer in magnitude D and E must be for the salience of the EFWN metric to be manifested. EXP is the exponential function.

The funneling weighted netting (FWN) transformation 248 may be represented by the following:

$$\text{FWN:'} = (1-\text{EXP}(-\text{POW}(\text{abs}(D-E)/T,4)))^* \text{TANH}(\max(D,E)/S)^* (\min(B+1,C+1)/\max(B+1,C+1))'$$

The FWN transformation 248 captures the case when there is extreme aggregation or disaggregation involved in the netting. For example, if there is a large number of transactions coming in and very few outgoing transactions for the same or similar total amount, this may be detected using the FWN transformation 248. The power function POW has two arguments and is evaluated as the first argument raised to the power of the second. The choice of 4 for the second argument seems to be reasonable in practice for capturing the salience of the funneling activity.

According to some examples, variants of the transformations 242-248 may be used. For example, a first variant replaces the ratio term "min(B+1,C+1)/max(B+1,C+1)" in the formulas for EFWN, MFWN and FWN formulas by the value weighted ratio VWN, thereby combining elements of both value and frequency into the netting formulas.

According to a second variant, D and E represent a number of counterparties in and a number of counterparties out, respectively, as opposed to a number of deposits and a number of withdrawals, respectively, in the formulas for MFWN, EFWN and FWN.

According to some examples, the transformations may be executed as part of a machine learning model to detect anomalous activity among a plurality of transactions. The machine learning model may be any of a variety of types, such as neural network, boosted trees, etc. For a given account, or customer with multiple accounts, the counterparty on a credit transaction is the party making the deposit to that account, and the counterparty on a debit transaction is the party to whom the money is transferred. In a "netting" scenario for an account or customer, there are both credit counterparties (whose count is D) and debit counterparties (whose count is E).

FIG. 3 provides a table illustrating example ratios computed using the transformations 422-428. The table includes a number of rows, each row listing a number of related transactions. For example, such transactions may be identified using the sliding window to review ledgers, reports, or other information from one or more institutions. In this example, each row lists a total amount of funds going in, a total amount of funds going out, a total number of transactions going in (#Txn IN) that resulted in the total funds going in, and a total number of transactions going out (#Txn OUT) that resulted in the total funds going out.

The table in this example further includes a number of columns indicating the results of transformations, the results providing an indication of whether the transactions for a given row should be flagged as potential anomalous activity. Such columns include an Original column indicating results obtained using conventional analysis techniques, and a capped log column which is representative of some transformations in the prior art, whereby the original formula is modified to avoid numerical difficulties when the amounts in (B) and amounts out (C) are both zero, that is by "capping" the values of B and C less than 1 (also the capped log ratio columns can also be seen to reverse the rank ordering of the values in the Original column):

$$\text{capped log:}`=\text{ABS}(\text{LN}(\text{MAX}(1,B))-\text{LN}(\text{MAX}(1,C)))`.$$

The columns indicating transformation results further include results of the transformations 242-248 of FIG. 2. In particular, the columns include a VWN column using a threshold R, a MFWN column using a threshold S, an EFWN column using thresholds S, T, and a FWN column using thresholds S, T.

According to some examples, results in the table may be flagged using one or more indicia. By way of example only, a heat map may be implemented, where a first color such as green may indicate a low likelihood of anomalous activity and a second color such as red may indicate a high likelihood of anomalous activity. Additional colors, such as yellow, orange, etc., may indicate likelihood of anomalous activity at levels in between low and high. According to other examples, other indicia may be used in addition to or in the alternative to heat maps. By way of example only, results above a predetermined threshold may be highlighted or may trigger an alert or other notification.

As seen in FIG. 3, the capped log inverts the rank ordering of the Original results, and consequently reverses the heat map of the Original results. For example, rows 10 and 11 of the chart indicate a high likelihood of potential anomalous activity using the Original computations, but a low likelihood using the capped log computations. Comparing rows 10 and 11, each maps to the same results under the Original and capped log approaches, though row 11 involves greater amounts in/out and a greater number of transactions out. It is noteworthy that many machine learning algorithms (e.g. decision trees) are invariant to any transformations that retain or reverse the ranked ordering of the original feature values. When used as features for this class of algorithms the capped log would be equivalent to the Original approach.

Looking at the VWN transformation for rows 10-11, row 10 is damped relative to row 11. Moreover, rows 4, 9, and 12 are amplified. Comparing the VWN for row 4 as compared to rows 9, 12, row 4 involves a single large transaction with no apparent attempt to structure the transfer into smaller quantities. In contrast, rows 9, 12 involve numerous small transactions to collect and disperse the funds. Accordingly, the results of rows 9, 12 using VWN transformations indicate a higher likelihood of anomalous activity.

The MFWN column reflects results of transformations where netting ratios are modulated by a factor that accounts for the number of transactions involved. For example, as shown in FIG. 3, row 4 is relatively damped and rows 9, 11, and 12 are amplified by the MFWN transformation. Rows 9, 11, and 12 have some distinct characteristics. For example, each incoming transaction in row 12 is rapidly dispersed as soon as it comes in. In rows 9, 11, the incoming and outgoing transactions show extreme asymmetric patterns of aggregation or disaggregation, respectively, in the netting.

The EFWN transformation has two parameters, S and T, and introduces a sharp transformation to capture a scenario when the number of incoming and outgoing transactions in the netting are approximately equal. For example, as seen in the EFWN column, a significance of row 12 is amplified while a significance of rows 9, 11 is dampened.

FWN transformations use the same parameters S and T as EFWN. The FWN transformation amplifies the case in rows 9 and 11 to capture the case when there is extreme aggregation or disaggregation involved in the netting, e.g. funneling.

Figure 4:
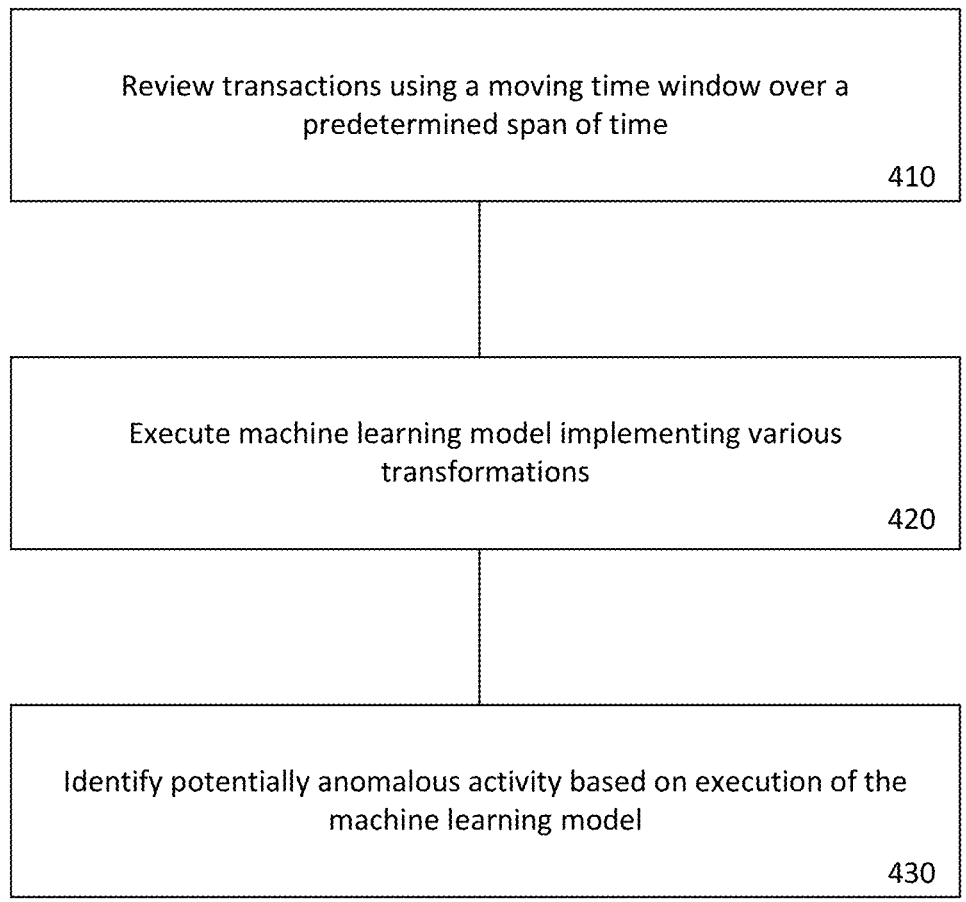
FIG. 4 is a flow diagram illustrating an example method of identifying anomalous transactions according to aspects of the disclosure.

FIG. 4 provides a flow diagram illustrating an example method 400 of using the transformations described above to identify potentially anomalous activity among a plurality of transactions. The method 400 may be executed by, for example, one or more computing devices based on transaction data received from an entity, such as a financial institution or other entity. While the operations are described in a particular order, it should be understood that the order may be modified or operations may be executed in parallel. Moreover, operations may be added or omitted.

Block 410 includes a review of the plurality of transactions using a moving time window over a predetermined span of time. For example, the moving time window may consider a time period of several days, such that the time window identifies related transactions occurring within the time period. Examples of such transactions may include deposits to an account, withdrawals from an account, deposits or withdrawals by a particular entity, etc. The moving window may move across the predetermined span of time, such as a span of several months, years, etc. As a result of the review, one or more sets of related transactions may be identified, such as by identifying amounts deposited or withdrawn, aggregate amounts, a number of transactions corresponding to the aggregate amount deposited or withdrawn, etc. By way of example only, such identified transactions may be collected or organized in a data structure, such as a chart, graph, log, etc. Referring to the example of FIG. 3, each set of transactions is reflected in a separate row of a graph.

Block 420 includes execution of a machine learning model implementing various transformations. Examples of such transformations may include, for example, VWN, MFWN, EFWN, and FWN as discussed above. For each set of transactions, each transformation may produce a result. For example, the result may be a ratio, value, or other indication.

Block 430 includes identifying potentially anomalous activity based on the execution of the machine learning model. For example, results of transformations that meet or exceed a predetermined threshold may be flagged, such as by using a visual indicator such as a heat map, flag, or the like, by triggering an alert, such as a message or an audible or visual notification, or by any other mechanism. The values resulting from the various transformations may be considered individually and/or collectively by the machine learning model. For example, the machine learning model may in some cases only flag a set of transactions as potentially anomalous if the results of multiple transformations exceed a first threshold. In other examples, a set of transactions may be flagged if any given transformation produces a result that exceeds a second threshold. In other examples, degrees to which the set of transactions appears anomalous under the various transformations may be considered. For example, the machine learning model may flag a set of transactions as anomalous if multiple transformations result in a moderate likelihood of anomalous activity, or if any one result of the multiple transformations results in a high likelihood of anomalous activity.

The foregoing features may be implemented to capture large volumes and unusual patterns or frequency of netting or rapid movement of funds. For example, such features capture large amounts of currency involved, large numbers of transactions involved, unusual patterns of netting transactions such as highly asymmetric credit and debit transaction counts indicating funneling, and unusual patterns of netting transactions such as highly symmetric credit and debit transaction counts indicating rapid clearing of individual transactions through the account (anti-funneling).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for detecting anomalous activity related to potential fraud or criminal activity among a plurality of transactions, comprising: memory; and one or more processors in communication with the memory, the one or more processors configured to: retrieve the plurality of transactions from a sliding time window; review the plurality of transactions in one or more data structures identifying the transactions; identify one or more sets of potentially related transactions occurring within the sliding time window; receive, via a graphical user interface, a parameter related to one or more transformations; generate, based on application of a machine learning model to the one or more sets of potentially related transactions and using the received parameter, results of the one or more various transformations; identify potentially anomalous activity corresponding to the one or more sets of potentially related transactions; flag the identified potentially anomalous activity using one or more perceptible indicia; and output a table containing the results of the one or more various transformations for display via the graphical user interface.

2. The system of claim 1, wherein in reviewing the one or more sets of potentially related transactions, the one or more processors are configured to apply the sliding time window over a predetermined span of time.

3. The system of claim 2, wherein in identifying the one or more sets of potentially related transactions, the one or more processors are configured to aggregate individual transactions within the sliding time window based upon one or more characteristics of the transactions.

4. The system of claim 1, wherein the various transformations comprise at least one of value weighted netting, maximum frequency weighted netting, equal frequency weighted netting, or funneling weighted netting.

5. The system of claim 1, wherein in identifying potentially anomalous activity the one or more processors are further configured to identify which of the results meets or exceeds a predetermined threshold.

6. The system of claim 5, wherein in identifying potentially anomalous activity the one or more processors are further configured to generate a heat map, wherein results exceeding a first threshold are indicated using a first color and results exceeding a second threshold are indicated using a second color.

7. The system of claim 1, wherein each of the various transformations is based on one or more parameters, the one or more parameters relating to at least one of an aggregate amount for a given set of transactions or an aggregate number of transactions in the given set of transactions.

8. The system of claim 1, wherein in identifying potentially anomalous activity, the one or more processors are further configured to identify multiple results for a given set of transactions that exceeds a first threshold corresponding to a moderate likelihood of anomalous activity.

9. The system of claim 1, wherein in identifying potentially anomalous activity, the one or more processors are further configured to identify at least one result for a given set of transactions that exceeds a second threshold corresponding to a high likelihood of anomalous activity.

10. The system of claim 1, wherein in identifying potentially anomalous activity, the one or more processors are further configured to trigger an alert flagging the potential anomalous activity.

11. A method of detecting anomalous activity related to potential fraud or criminal activity among a plurality of transactions, comprising:
retrieve the plurality of transactions from a sliding time window;
reviewing, with one or more processors, data structures identifying the plurality of transactions;
identifying, with the one or more processors, one or more sets of potentially related transactions occurring within the sliding time window;
in a graphical user interface, receiving one or more parameters related to a number of various transformations;
generating, with the one or more processors based on application of a machine learning model, results of the number of various transformations using the one or more parameters and applied to the identified one or more sets of potentially related transactions;
identifying, with the one or more processors, potentially anomalous activity corresponding to the one or more sets of potentially related transactions;
generating a table and flagging, with the one or more processors, the identified potentially anomalous activity using one or more perceptible indicia; and
outputting the table for display via the graphical user interface.

12. The method of claim 11, wherein the reviewing comprises applying a moving time window over a predetermined span of time, and the identifying of the one or more sets of potentially related transactions comprises aggregating individual transactions within the sliding time window based upon one or more characteristics of the transactions.

13. The method of claim 11, wherein the various transformations comprise at least one of value weighted netting, maximum frequency weighted netting, equal frequency weighted netting, or funneling weighted netting.

14. The method of claim 11, wherein identifying potentially anomalous activity comprises identifying which of the results meets or exceeds a predetermined threshold.

15. The method of claim 14, wherein identifying potentially anomalous activity comprises generating a heat map, wherein results exceeding a first threshold are indicated using a first color and results exceeding a second threshold are indicated using a second color.

16. The method of claim 11, wherein each of the various transformations is based on one or more parameters, the one or more parameters relating to at least one of an aggregate amount for a given set of transactions or an aggregate number of transactions in the given set of transactions.

17. The method of claim 11, wherein identifying potentially anomalous activity comprises identifying multiple results for a given set of transactions that exceeds a first threshold corresponding to a moderate likelihood of anomalous activity.

18. The method of claim 11, wherein identifying potentially anomalous activity comprises identifying at least one result for a given set of transactions that exceeds a second threshold corresponding to a high likelihood of anomalous activity.

19. The method of claim 11, wherein identifying potentially anomalous activity comprises triggering an alert flagging the potential anomalous activity.

20. A non-transitory computer-readable medium storing instructions executable by one or more processors for performing a method of detecting anomalous activity related to potential fraud or criminal activity among a plurality of transactions, comprising:
    retrieving the plurality of transactions a sliding time window;
    reviewing data structures identifying the plurality of transactions;
    identifying one or more sets of potentially related transactions occurring within the sliding time window;
    providing a graphical user interface and receiving from a user, parameters related to various transformations;
    generating, based on application of a machine learning model, results of the various transformations using the received parameters and applied to the identified one or more sets of potentially related transactions; and
    identifying, based on the results, potentially anomalous activity corresponding to the one or more sets of potentially related transactions
    producing a table and flagging, with the one or more processors, the identified potentially anomalous activity using one or more perceptible indicia; and
    displaying the table to user in the graphical user interface.

* * * * *